US011378345B2

(12) United States Patent
Bissell et al.

(10) Patent No.: US 11,378,345 B2
(45) Date of Patent: Jul. 5, 2022

(54) ACTIVE CRYSTALLISATION CONTROL IN PHASE CHANGE MATERIAL THERMAL STORAGE SYSTEMS

(71) Applicant: Sunamp Limited, Lothian (GB)

(72) Inventors: Andrew John Bissell, Lothian (GB); Maurizio Zaglio, Lothian (GB); David Oliver, Lothian (GB); Santokh Singh Gataora, Lothian (GB)

(73) Assignee: Sunamp Limited, Edinburgh (GB)

( * ) Notice: Subject to any disclaimer, the term of this patent is extended or adjusted under 35 U.S.C. 154(b) by 337 days.

(21) Appl. No.: 16/617,276

(22) PCT Filed: May 31, 2018

(86) PCT No.: PCT/GB2018/051483
§ 371 (c)(1),
(2) Date: Nov. 26, 2019

(87) PCT Pub. No.: WO2018/220378
PCT Pub. Date: Dec. 6, 2018

(65) Prior Publication Data
US 2020/0149826 A1    May 14, 2020

(30) Foreign Application Priority Data
Jun. 1, 2017    (GB) ..................... 1708724

(51) Int. Cl.
*F28D 20/02*    (2006.01)
*F25B 21/02*    (2006.01)

(52) U.S. Cl.
CPC ............ *F28D 20/021* (2013.01); *F25B 21/02* (2013.01); *F28D 20/028* (2013.01); *F25B 2321/02* (2013.01); *F25B 2321/021* (2013.01)

(58) Field of Classification Search
CPC .................................................... Y02E 60/14
See application file for complete search history.

(56) References Cited

U.S. PATENT DOCUMENTS

| | | | |
|---|---|---|---|
| 4,199,021 A | 4/1980 | Thoma | |
| 4,461,153 A | 7/1984 | Lindner et al. | |
| 6,152,212 A | 11/2000 | Saita | |
| 9,709,337 B2 * | 7/2017 | Pilebro | ............... F28D 20/0043 |
| 9,873,350 B2 * | 1/2018 | Martin | .................... B60L 53/56 |

(Continued)

FOREIGN PATENT DOCUMENTS

| | | |
|---|---|---|
| DE | 3029780 | 3/1982 |
| DE | 10303498 | 8/2004 |

(Continued)

OTHER PUBLICATIONS

Search Report under Section 17 corresponding to GB Application No. 1708724.8 (4 pages) (dated Jul. 30, 2018).

(Continued)

*Primary Examiner* — Ana M Vazquez
(74) *Attorney, Agent, or Firm* — Myers Bigel, P.A.

(57) ABSTRACT

The present invention relates to phase-change materials (PCM) which store and release thermal energy by undergoing melt/crystallisation cycles. More particularly, there is described a thermal storage system where sub-cooled phase change material (PCM) is nucleated via a controlled thermal region(s).

19 Claims, 6 Drawing Sheets

(56) References Cited

U.S. PATENT DOCUMENTS

| | | | |
|---|---|---|---|
| 2011/0226440 A1* | 9/2011 | Bissell | F28D 20/026 |
| | | | 165/10 |
| 2012/0125285 A1 | 5/2012 | Brandes et al. | |
| 2012/0174598 A1 | 7/2012 | Brandes et al. | |
| 2013/0019849 A1* | 1/2013 | Zillmer | F24B 1/02 |
| | | | 126/80 |
| 2013/0104569 A1* | 5/2013 | Ballnik | A61F 7/007 |
| | | | 62/3.2 |
| 2015/0345874 A1 | 12/2015 | Honda et al. | |
| 2018/0166758 A1* | 6/2018 | Thomas | B60L 58/27 |

FOREIGN PATENT DOCUMENTS

| | | |
|---|---|---|
| DE | 102009028863 | 3/2011 |
| DE | 102013220281 | 4/2015 |
| DE | 102014208616 | 11/2015 |
| EP | 1186838 | 3/2002 |

OTHER PUBLICATIONS

International Preliminary Report on Patentability corresponding to International Patent Application No. PCT/GB2018/051483 (22 pages) (dated Sep. 16, 2019).

International Search Report and the Written Opinion of the International Searching Authority corresponding to International Patent Application No. PCT/GB2018/051483 (13 pages) (dated Aug. 31, 2018).

\* cited by examiner

ACTIVE CRYSTALLISATION CONTROL IN PHASE CHANGE MATERIAL THERMAL STORAGE SYSTEMS

FIELD OF THE INVENTION

The present invention relates to phase change materials (PCMs) which store and release thermal energy by undergoing melt/crystallisation cycles.

BACKGROUND TO THE INVENTION

Phase change materials (PCMs) store and release thermal energy by undergoing melt/crystallisation cycles.

One issue with PCMs is inconsistent nucleation temperature. Nucleation, the first step of the crystallisation process, may not occur due to the PCM sub-cooling (remaining below its melting point but not crystallising), or may occur spontaneously at differing temperatures, or at different times or differing between cooling rates etc.

This issue has been overcome and utilised by creating a controlled thermal region within the PCM containment, which results in control of nucleation resulting in consistent, predictive and selectable crystallisation.

Nucleation can also be initiated by addition of a seed crystal. For example, this can be done via adding a seed crystal (i.e. similar to dropping in a seed crystal to a sub-cooled solution or liquid to initiate crystallisation in the bulk) via a mechanical means, i.e. a crystal dropper or similar; or having a region when some material is crystallised. Contact with crystallised material and the bulk sub-cooled solution/liquid can be made, and then unmade; or releasing a seed crystal from a confined geometry where the seed crystal exists but is not in sufficiently direct contact with the bulk sub-cooled solution or liquid to cause crystallisation of the bulk until the moment of release, i.e. a material with cracks, such as a stamped metal plate/disk may have. For example, these may be microscopic cracks where seed crystals can reside above their normal melting point, and when these are activated, e.g. flexed, then the cracks open up and release seed crystals resulting in crystallisation of the bulk solution/liquid.

The method of utilising seed crystals to initiate crystallisation can be applied in primarily two methods: actively and passively. In an active method a mechanism is activated (e.g. through an electronic signal, presence of water flow, mechanical button, external pressure differential) where a seed crystal is released or added to the bulk solution/liquid resulting in bulk crystallisation. In a physical embodiment, this may be, e.g. a crystal dropping mechanism, a plate/disk of metal which is deformed/flexed through mechanical means, or that changes geometry/shape when electricity/an electrical field is passed through it/applied, or a valve that can open which makes contact between a sample of crystallised material and the bulk sub-cooled solution/liquid, or as opposed to a valve, a sample of crystallised material can be 'dunked' in the sub-cooled solution/liquid and then 'un-dunked'. For example, this may be on a tip of a needle/thin rod etc. In a passive embodiment the seed crystal(s) are generated without an external mechanism but are initiated by the temperature of the bulk material, i.e. when a sub-cooling solution/liquid drops below a set temperature then a process is initiated which releases seed crystals. For example, this may be a submerged metal plate/disk which is e.g. bimetallic, and flexes as needed at the set temperature and then releases seed crystals, which initiates bulk crystallisation. The effect of this is to have a material where the effect of sub-cooling is not significantly observable.

A related problem is a nucleation additive used to prevent sub-cooling passively may lose its nucleator properties through a thermally driven 'deactivation process'. One example of this is if a nucleator is required to be a specific hydrate, then this hydrate can melt/dehydrate. An actively controlled thermal region within the PCM containment can therefore also be used to keep a nucleator functional.

The use of multiple of the same or different methods within a single system may have significant benefit, such as increased crystallisation rate, as a result of nucleation commencing from multiple places.

It is an object of at least one embodiment of the present invention to provide an improved phase change material where sub-cooled phase-change material (PCM) is nucleated via a controlled thermal region(s).

SUMMARY OF THE INVENTION

According to a first aspect of the invention there is provided a thermal storage system where sub-cooled phase change material (PCM) is nucleated via a controlled thermal region(s).

According to a further aspect of the invention there is provided a system where sub-cooled PCM is nucleated by the generation of a cold shock. A cold shock may be described as a small region within the sub-cooled PCM which is sufficiently cold to initiate nucleation.

According to a further aspect of the present invention there is provided a method of using PCMs where the PCM is housed in a containment vessel and has a heat exchanger internally, to permit the transfer of heat or coolth (thermal energy) into/out of the PCM.

The cold shock may be generated via a thermoelectric device, or a compression vapor cycle device, or a heat pipe, or a switchable heat pipe, or cooling an area in thermal contact with the PCM with a cold material, i.e. dry ice, liquid nitrogen, or the rapid expansion of a material which evaporates very endothermically.

There is also described a PCM system which does not exhibit sub-cooling upon discharge due to the presence of a cold spot maintained thermoelectrically, or by a compression vapor cycle, or by a heat pipe, or by a switchable heat pipe, that actively keeps some PCM crystalline at all times.

There is also described a PCM system which does not exhibit sub-cooling upon discharge due to the presence of a cold spot maintained thermoelectrically, or by a compression vapor cycle, or by a heat pipe, or by a switchable heat pipe, that actively keeps some PCM crystalline when the PCM approaches its melting point.

There is also described a system where a PCM system does not exhibit sub-cooling upon discharge due to the presence of a cold spot maintained thermoelectrically, or by a compression vapor cycle, or by a heat pipe, or by a switchable heat pipe, that actively keeps some nucleating agent below its deactivation temperature when the PCM is above/near this.

There is also described a system where the thermoelectric device consists of one or more thermoelectric devices stacked, optionally with heat spreaders between thermoelectric interfaces, a final cold face with a heat spreader with thermal insulator to create a cold concentrator.

There is also described a system where a cold side of a thermoelectric device is in contact with the PCM and the hot side of the thermoelectric device is in thermal contact with either: the ambient, the PCM heat exchanger or another PCM storage system.

There is also described a system where a cold face of the thermoelectric device has a cold concentrator.

There is also described a system where the hot side of the thermoelectric device, or a compression vapor cycle device, or a heat pipe, or a switchable heat pipe, is in thermal contact with either: the ambient, the PCM heat exchanger or another PCM store.

There is also described a system where an electrical store is charged by the thermoelectric device, the same thermoelectric device then utilises the same electrical store to generate coolth to function at a later time.

There is also described a system where the thermoelectric device, or a compression vapor cycle device, is powered from an electrical store, where said electrical store is charged from local electrical supply (e.g. network electricity, 12 v/24 v/48 v vehicle system).

There is also described a system where the thermoelectric device is controlled via PWM or preferably direct-drive.

There is also described a system where a temperature sensor either in, or locally to the thermoelectric device, or a compression vapor cycle device, or a heat pipe, or a switchable heat pipe, provides information feedback, to for example, the power electronics.

DESCRIPTION OF THE FIGURES

The invention will now be described with reference to the following figures in which.

DETAILED DESCRIPTION a. PCM Heat Storage Systems

A method to use PCMs is to house the PCM in a containment vessel and to have a heat exchanger internally, to permit the transfer of heat or coolth (thermal energy) into/out of the PCM.

Figure 1:
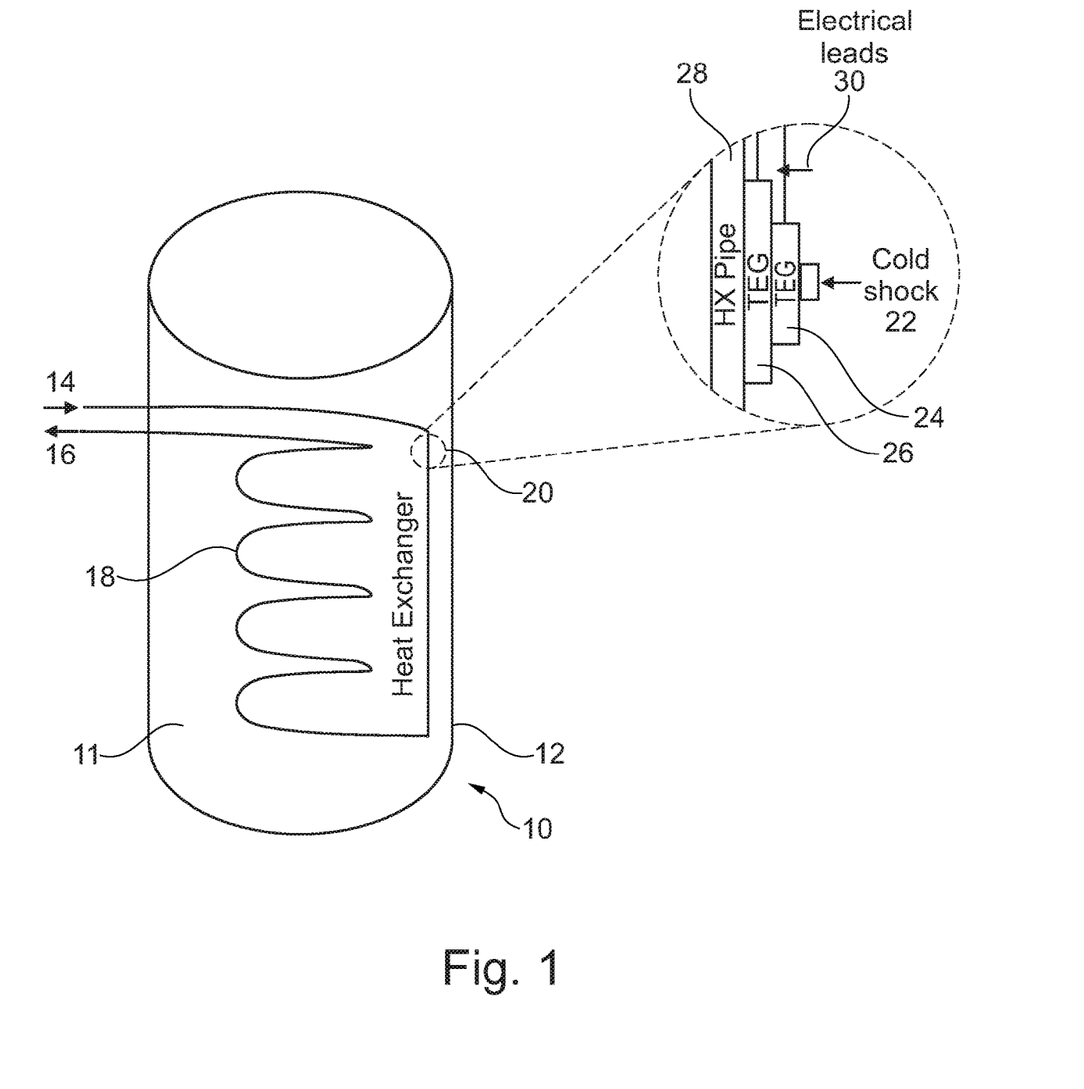
FIG. 1 is a representation of a heat storage system comprising a heat exchanger in PCM within a containment vessel which shows a cold shock set-up where the heat sink is the heat exchanger of the PCM containment system.

FIG. 1 is a representation of a heat storage system 10 comprising a heat exchanger 18 located within a containment vessel 12. The heat exchanger 18 is immersed in PCM 11 which is contained within the containment vessel 12. The heat exchanger 18 has an input 14 and an output 16. The heat exchanger 18 functions to transfer heat in and/or out the heat storage system. Any number and type of heat exchangers may be used.

FIG. 1 also shows a cold shock area set-up generally represented by the reference numeral 20. The cold shock area 20 has been expanded and is located at the top of the containment vessel 10. As shown in the expanded area there is a cold shock 22 located adjacent to thermoelectric devices (TEG) 24, 26 and a heat exchange pipe (HX pipe) 28. Electrical leads 30 are also shown attached to the thermoelectric devices 24, 26.

Figure 2:
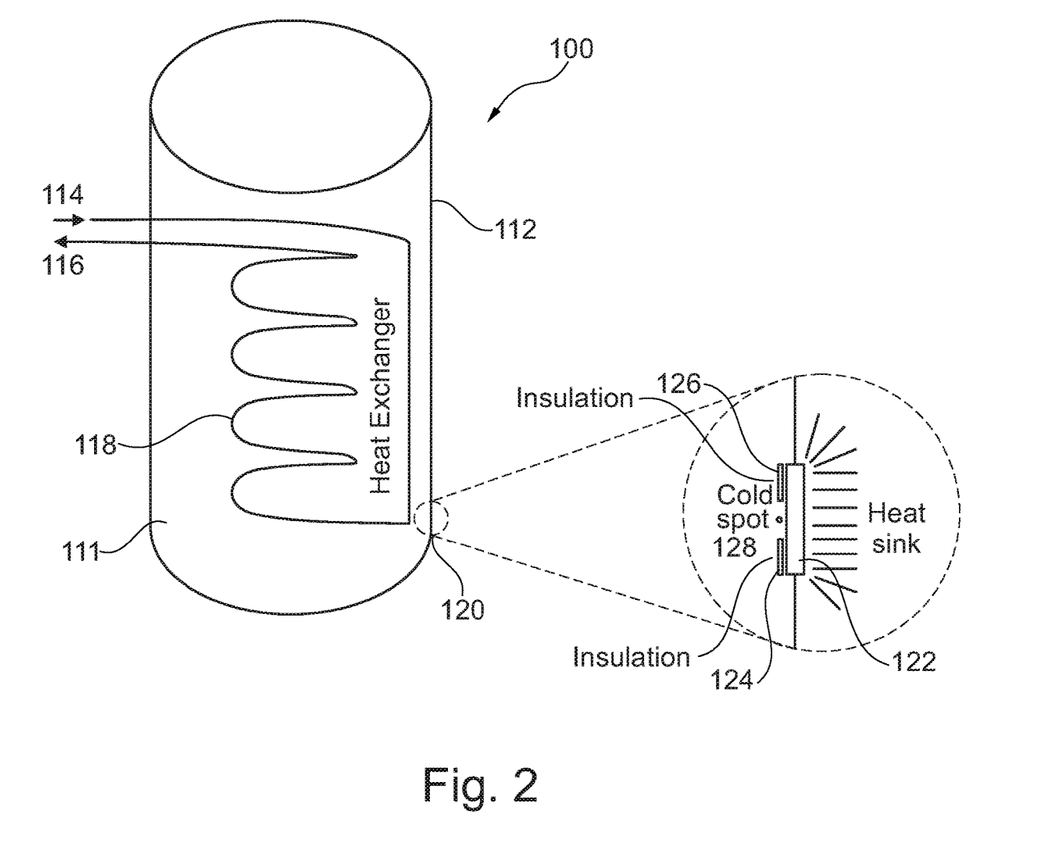
FIG. 2 is a representation of a heat storage system comprising a heat exchanger in PCM within a containment vessel which shows a cold spot set-up where the heat sink is the ambient through a heat sink external to the containment vessel.

FIG. 2 is a representation of a further heat storage system 100. The heat storage system 100 contains a PCM 111 within a containment vessel 112. A heat exchanger 118 is immersed in the PCM 111. The heat exchanger 118 has an input 114 and an output 116. The heat exchanger 118 functions to transfer heat in and/or out for the heat storage system 100. Any number and type of heat exchangers may be used.

In the heat storage system 100 shown in FIG. 2 there is a cold shock area 120 located at the bottom of the containment vessel 112. The cold shock area 120 is expanded in size where it can be seen there is a cold spot 128. Near the cold spot 128 there is insulation areas 124, 126. Located under the insulation areas 124, 126 there is a heat sink 122.

As shown in FIG. 2 in the heat storage system 100 the heat sink is the ambient through a heat sink external to the containment vessel 112.

b. Thermoelectric Devices b1. Thermoelectric Devices Thermoelectric devices operate using the Peltier effect, and results in a heat pump type effect on a small, solid-state, scale. A thermoelectric device is typically a rectangular plate of thickness less than 10 mm, with a ceramic coating on the two large faces. When an electrical current is passed through the thermoelectric device, heat is generated on one face, and coolth on the other. Such a thermoelectric device is used in the heat storage system 10 shown in FIG. 1.

b2. Compression Vapor Cycle Devices

Compression vapor cycle devices utilise the boiling (or evaporation), of a fluid to provide cooling, generally in a closed loop where the reverse process (condensation) also occurs at a different location (or the same).

b3. Heat Pipe, or a Switchable Heat Pipe

A heat pipe, or a switchable heat pipe, are objects that have a liquid or gas inside them that are sealed and there is a change of phase when heat or cold is applied to one or more region of the object.

In a switchable heat pipe added control is offered. The effect is an object that can show (optionally if switchable) high levels of thermal conductivity at certain temperatures or temperature ranges.

c. Sub-Cooling

For a PCM to sub-cool, the whole of the material must be molten, i.e. there must be no unmelted material, otherwise the unmelted material will be an area of crystal growth.

This has the following ramification: the PCM must be fully melted if it is to sub-cool. If the material is not fully melted, then the material will not sub-cool.

Sub-cooling can be passively avoided if a nucleating agent is used (an additive that prevents sub-cooling by providing an area/surface for crystal growth). The use of nucleating agents can be optimised by controlling where they are located and how they are contained, i.e. in a mesh or porous material.

d. Cold Spot

If a PCM has no known sufficient method (e.g. an additive) to ensure consistent nucleation, then that may prevent its use. A method to overcome that would be to design a containment that has a thermoelectrically driven "cold spot", where crystals of the bulk PCM (or other relevant crystals) are kept in the unmelted state. This is a focus of the present application.

The mass of these crystals can be very small—they are seed crystals that provide a point of growth. It is an advantage to keep this mass of crystals small. This mass of crystals requires to be continuously cooled when the bulk PCM is in the charged (molten) state, and so is preferably minimised.

Figure 3:
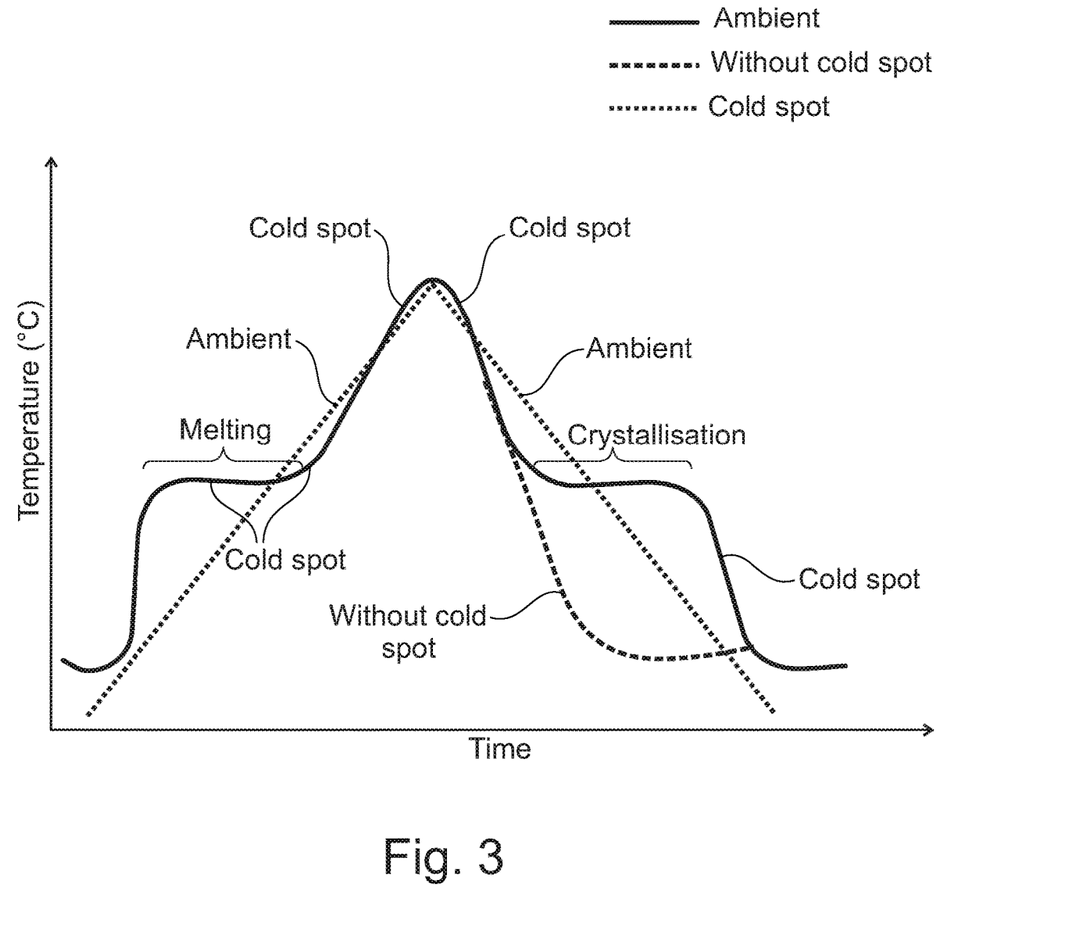
FIG. 3 is a representation which shows the effect that the use of a cold spot achieves. It can be seen that the cooling curve of the system with a cold finger (solid line) goes through a crystallisation during cooling whereas the system with no cold spot (dashed line) does not, as represented by the lack of a crystallisation plateau. The effect of such is that the system with a cold spot has far superior energy storage capacity.
Figure 4:
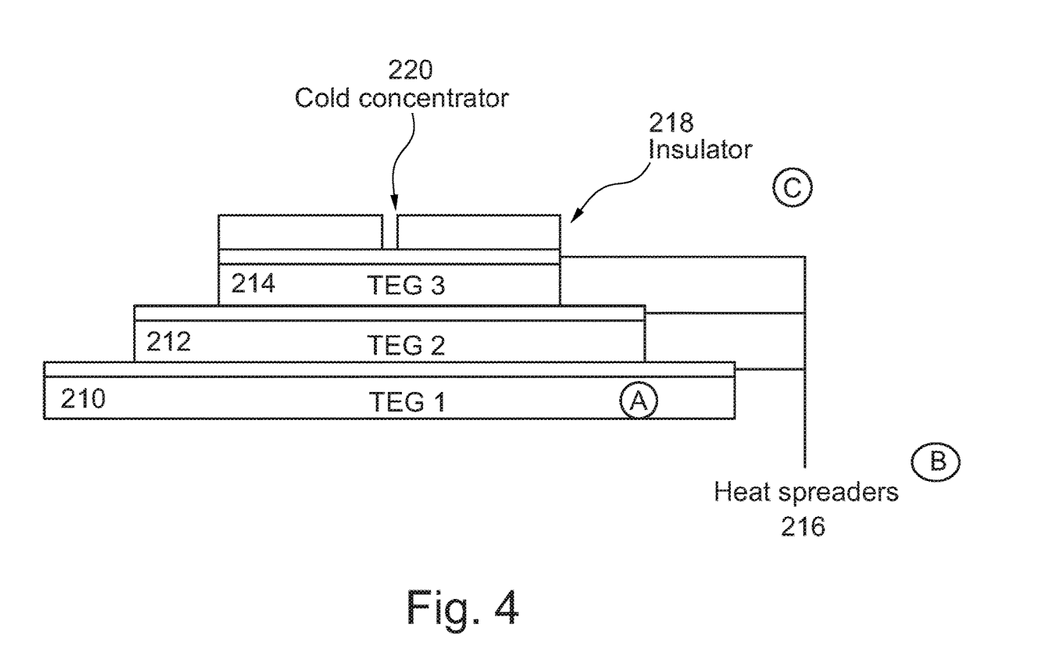
FIG. 4 is a representation of a stacked thermoelectric device setup that can provide a cold shock; with thermoelectric devices (TEG, A), heat spreader (B) and insulation (C) to act as a cold concentrator.
Figure 5:
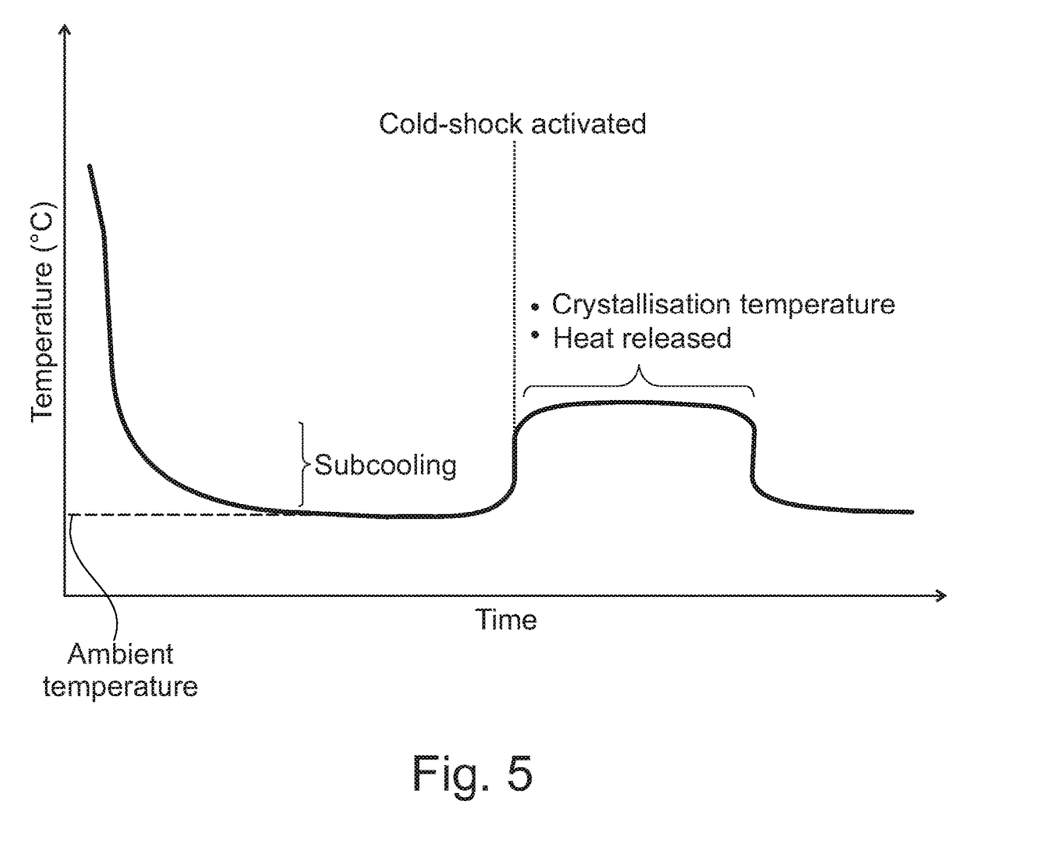
FIG. 5 is a representation of the use of a sub-cooled PCM store with cold shock activator. The PCM has cooled to ambient without crystallising; it remains at that temperature for a period of time; the cold shock is then activated; crystallisation begins and the PCM heats up

The technical effect of this is shown in FIG. 3. The effect that the use of a cold spot achieves is shown. It can be seen that the cooling curve of the system with a cold spot goes through a crystallisation during cooling whereas the system with no cold spot does not, as represented by the lack of a crystallisation plateau. The effect of such is that the system with a cold spot has far superior energy storage capacity and operates at a higher temperature (higher energy). This is one of the benefits of the present invention and the heat storage systems herein described.

There are multiple methods to generate and maintain cold spots. These are described herein and are part of the present invention.

(i) Implementation

The power consumption of the cooling spot is proportional to the heat transfer rate from the bulk PCM to the cold spot—hence it has been found to be preferable to have a measure of insulation between the cold spot with crystals and the bulk of PCM.

If too much insulation is used, then the response time of the cold spot is reduced. This is due to the need for a "thermal bridge" between the internal heat exchanger and the cold mass of crystals—this "thermal bridge" is a crystallisation pathway between the cold spot and the internal heat exchanger.

An alternative is to use the cold spot to protect a nucleating agent, as opposed to the PCM. A nucleation additive used to prevent sub-cooling passively may lose its nucleator properties through a thermally driven 'deactivation process'.

One example of this is if a nucleator is required to be a specific hydrate, then this hydrate can melt/dehydrate. An actively controlled thermal region within the PCM containment can therefore be used to keep a nucleator functional.

An advantage of this is the thermoelectric device, or a compression vapor cycle device, or a heat pipe, or a switchable heat pipe, does not need to run as often. This reduces running costs and extends lifetime, since the temperature of the cold spot is above the bulk temperature of the PCM.

(ii) Optimisation

Figure 6:
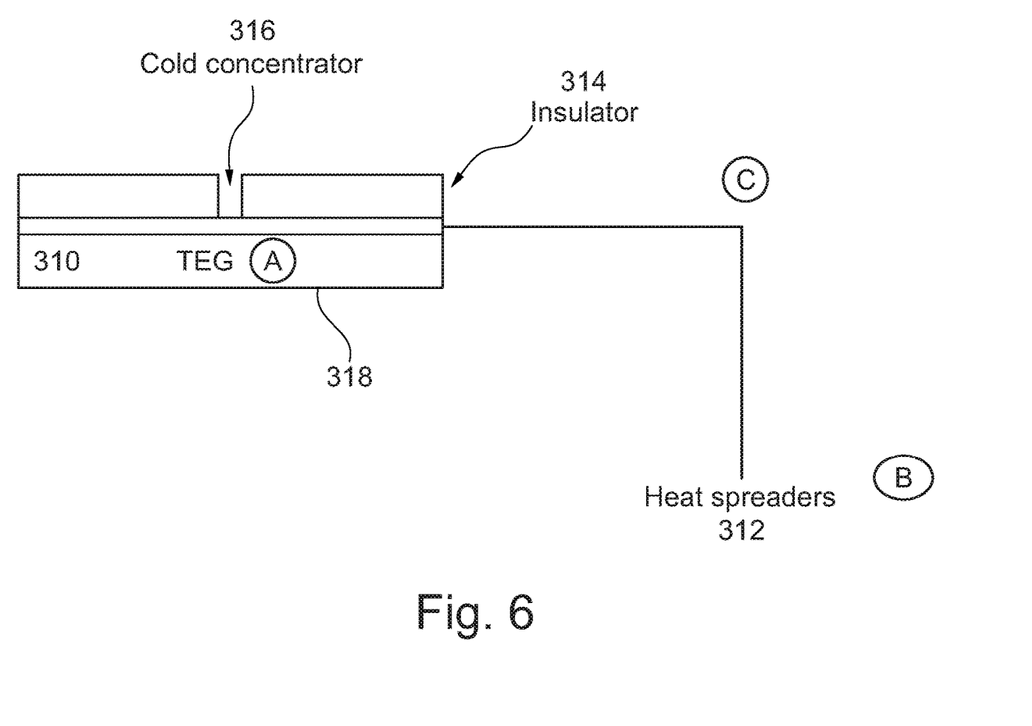
FIG. 6 is a representation of a cold spot with a single thermoelectric device (TEG, A), heat spreader (B) and insulation (C) to act as a cold concentrator.

As shown in FIG. 6 the cold thermoelectric face 316 has a high thermal conductivity interface material, labelled as heat spreaders 312 in FIG. 6.

As shown in FIG. 6 there is a cold spot with a single thermoelectric device 310 (TEG, A), heat spreader 312 (B) and insulation 314 (C) to act as a cold concentrator. The heat spreader may be a sheet of graphite, or a metal, such as copper or aluminium. The insulator may be paste or adhesive based.

The high thermal conductivity interface material 310 is supplemented by the use of a thermal insulator 310 to cover all of the high thermal conductivity interface material with the exception of a very small area which is left exposed (e.g. about 0.01 mm-5 mm, about 0.1 mm-2 mm about 0.1 mm-1 mm)—this concentrates the coolth towards one small section, thus achieving a lower temperature or reducing the power consumption (i.e. cold concentrator 316).

The hot side 318 of the thermoelectric device(s) 310 requires a heat sink to dissipate heat. This may be: the PCM itself, the internal heat exchanger of the PCM system or preferably the ambient as shown in FIG. 2. FIG. 2 is a representation of a heat exchanger 118 in PCM 111 within a containment vessel 112.

FIG. 2 shows a cold spot set-up where the heat sink is the ambient through a heat sink external to the containment vessel 112.

An expansion of this is shown in FIG. 2 where the hot side of the thermoelectric device 118 is thermally connected to a second PCM store (the PCM or the internal heat exchanger, but preferably the heat exchanger). This has an additional benefit in that the thermal energy is conserved and is utilised to heat an adjacent heat store. This process can also be used to pump heat from one heat store to another heat store, which is covered in patent WO 2011/058383, which is incorporated herein by reference.

A temperature sensor can be located near the interface of the thermoelectric device and PCM to determine the cooling requirements of the thermoelectric device. Alternatively, the temperature sensor can be internal to the thermoelectric device or form part of the heat interface material or within the insulating material.

The optimisation is also applicable to a compression vapor cycle device.

The optimisation is also applicable to a heat pipe, or a switchable heat pipe. The use of one or multiple of heat pipes on either the hot or cold side of a thermoelectric device (TEG or TED) further enhances the control over thermal regions.

e. Battery Power

There exist applications where it is advantageous to have a standalone system i.e. not connected to mains electricity, but instead any and all electrical power comes from an electrical storage device, such as a capacitor or electrical battery.

When a thermoelectric device has a temperature differential between its two faces, it is possible to, "in effect"— run the thermoelectric device backwards and generate electricity from this temperature differential, rather than create a temperature differential from electricity. This can be used to charge said electrical store.

(i) Implementation

During the charging phase of the PCM the internal heat exchanger has a hot heat transfer fluid flowing through it. In applications where the thermoelectric system is attached to the heat exchanger this results in one side of the thermoelectric device(s) being hot whilst the other side is the temperature of, for example, the material— i.e. there exists a temperature differential.

In applications where the thermoelectric system is thermally connected to the ambient, this results in one side of the thermoelectric device(s) being cold whilst the other side is the temperature of, for example, the material. The material may be at a temperature above ambient—i.e. there exists a temperature differential.

A PCM store is fully melted and is hot. A thermoelectric device exists where one face is thermally connected to the ambient and one face is thermal connected to the PCM. Thus, there may exist a temperature differential. Furthermore, in instances where the material is going to be sub-cooled, the cooling effect from the electrical generation from the thermoelectric device is directed towards the PCM, which is going to cool to ambient regardless.

(ii) Applications

An example of an application where a standalone system is advantageous is provided below.

A small, cold resistant, electrical store triggers a cold shock to a PCM that is integrated in a fuel cell vehicle which is being used in an ambient temperature that is not permissible towards the operation of a fuel cell. Hence, the fuel cell requires pre-heating before use. This can be accomplished by activating the PCM store via a cold shock.

Alternatively, the fuel cell vehicle may be: an electric battery based system such as Li-ion batteries; a combustion engine; or an emergency heat source (survival suit).

On, for example a vehicle, there is at times available an electrical supply, which can be used to charge a cold resistant electrical store. This electrical store can later, when there is no available electrical supply (e.g. the other systems cannot operate because they are below their minimum operating temperature ranges) be used to run the thermoelectric device(s) to initiate the PCM system which generates heat that can be transferred to other systems, rendering these other systems operational.

f. Power Management

Thermoelectric devices require a DC power supply. Generally, thermoelectric devices require a relatively high amperage, low voltage DC power supply. It can be beneficial to modulate the power of the thermoelectric device.

(i) Implementation

Two common methods are known for thermoelectric power modulation; pulse wave modification (PWM) or direct-drive. Direct drive is preferable for reduced power consumption.

g. Integration of Thermoelectric Device, or a Compression Vapor Cycle Device, with PCM Thermal Store To prevent contamination of the internal electrical components of a thermoelectric device, or a compression vapor cycle device, it may be preferable to protect the electrical components of the thermoelectric device, or a compression vapor cycle device with a waterproof/PCM proof material. Non-limiting examples of such are: electrical potting compounds; silicone sealant; glues etc.

Whilst specific embodiments of the present invention have been described above, it will be appreciated that departures from the described embodiments may still fall within the scope of the present invention.

The invention claimed is:

1. A thermal storage system where sub-cooled phase change material (PCM) is nucleated via a controlled thermal region(s), said heat storage system comprising:
    a containment vessel;
    phase change material located in the containment vessel;
    a heat exchanger located inside the containment vessel and immersed in the phase change material, the heat exchanger having an input and an output; and
    a maintained cold spot that actively keeps some nucleating agent below its deactivation temperature when the PCM is above or near the deactivation temperature such that the PCM does not exhibit sub-cooling upon discharge,
    wherein the nucleating agent is a specific hydrate and wherein a deactivation process of the nucleating agent is dehydration or melting, and
    wherein nucleating PCM via a controlled thermal region within the containment vessel results in control of nucleation resulting in consistent, predictive and selectable crystallisation of the PCM.

2. A thermal storage system according to claim 1, wherein the controlled thermal region is the cold spot that actively protects the nucleating agent by keeping it below its thermally driven deactivation process temperature at all times and is maintained by thermal conductive pathway to an area of lower temperature than the PCM.

3. A thermal storage system according to claim 2, wherein the controlled thermal region of the thermal storage system comprises one or more of:
    (i) a heat spreader which comprises one of: a sheet of graphite, or a metal;
    (ii) a region of thermal contact with the ambient;
    (iii) a temperature sensor that provides information feedback;
    (iv) a compression vapor cycle device;
    (v) a heat pipe or a switchable heat pipe.

4. A thermal storage system according to claim 1, wherein the cold spot is maintained thermoelectrically, or by a compression vapor cycle, or by a heat pipe, or by a switchable heat pipe.

5. A thermal storage system according to claim 1, wherein the heat exchanger functions as a heat sink for the controlled thermal region of the heat storage system and the cold spot area is located towards the bottom of the containment vessel.

6. A thermal storage system according to claim 1, wherein within the controlled thermal region there is a thermal insulation area located within the containment vessel.

7. A thermal storage system according to claim 1, wherein the thermal storage system comprises a thermoelectric device which consists of one or more thermoelectric devices stacked, with heat spreaders between thermoelectric interfaces, a final cold face with a heat spreader with thermal insulator to create a cold concentrator.

8. A thermal storage system according to claim 7, wherein the final cold face is in contact with the PCM and a hot face is in thermal contact with any of: the ambient; a PCM heat exchanger; or another PCM storage system.

9. A thermal storage system according to claim 7, wherein an electrical store is charged by the thermoelectric device, the same thermoelectric device then utilises the same electrical store to generate cooling to function at a later time.

10. A thermal storage system according to claim 7, wherein the thermoelectric device is powered from an electrical store, where said electrical store is charged from local electrical supply.

11. A thermal storage system according to claim 7, wherein the thermoelectric device is controlled via pulse width modulation (PWM) or direct-drive.

12. A thermal storage system according to claim 1, wherein a temperature sensor provides information feedback.

13. A method for providing a cold spot in a thermal storage system where sub-cooled phase change material (PCM) is nucleated via a controlled thermal region (s), said method comprising:
    providing a containment vessel which has an input and an output;
    locating phase change material in the containment vessel;

locating a heat exchanger inside the containment vessel and immersing the heat exchanger in the phase change material;

wherein the phase change material does not exhibit sub-cooling upon discharge due to the presence of a maintained cold spot that actively keeps some nucleating agent below its deactivation temperature when the PCM is above/near the deactivation temperature, wherein the nucleating agent is a specific hydrate and wherein the deactivation process of the nucleating agent is dehydration or melting, and wherein nucleating PCM via a controlled thermal region within the containment vessel results in control of nucleation resulting in consistent, predictive and selectable crystallisation of the PCM, wherein the controlled thermal region is the cold spot and it provides an area for crystal growth, and wherein the cold spot actively protects the nucleating agent by keeping it below its thermally driven deactivation process temperature at all times and the cold spot is maintained by a heat pipe; or wherein the controlled thermal region is the cold spot that actively keeps some nucleating agent below its deactivation temperature when the PCM is above/near the deactivation temperature at all times and is maintained by thermal conductive pathway to an area of lower temperature than the PCM; and wherein the PCM system does not exhibit sub-cooling upon discharge due to the presence of the maintained cold spot that actively keeps some nucleating agent below its deactivation temperature when the PCM is above/near the deactivation temperature.

14. A method according to claim 13, wherein the PCM is housed in the containment vessel and where the heat exchanger located within the containment vessel which permits the transfer of heat or cooling (thermal energy) into/out of the PCM.

15. A method according to claim 13, wherein the heat exchanger located within the containment vessel functions as a heat sink for the heat storage system.

16. A method according to claim 13, wherein the power consumption of the cold spot is proportional to the heat transfer rate from the PCM to the cold spot and that therefore insulation is required between the cold spot with crystals and the PCM.

17. A method according to claim 16, wherein a cold thermoelectric face of the cold spot has a high thermal conductivity interface material comprising heat spreaders and insulation to act as a cold concentrator.

18. A method according to claim 17, wherein a thermal insulator covers the high thermal conductivity interface material apart from a small section which is left exposed and this concentrates the cooling towards the small section thus achieving a lower temperature or reducing the power consumption.

19. A method according to claim 18, wherein a hot side of a thermoelectric device comprises a heat sink to dissipate heat into the PCM itself, the internal heat exchanger of the PCM system or the ambient.

* * * * *

UNITED STATES PATENT AND TRADEMARK OFFICE
CERTIFICATE OF CORRECTION

PATENT NO. : 11,378,345 B2
APPLICATION NO. : 16/617276
DATED : July 5, 2022
INVENTOR(S) : Bissell et al.

It is certified that error appears in the above-identified patent and that said Letters Patent is hereby corrected as shown below:

On the Title Page (71) Applicant: Please correct "Sunamp Limited, Lothian (GB)" to read --Sunamp Limited, Edinburgh, Lothian (GB)--

(72) Inventor: Please correct "Andrew John Bissell, Lothian (GB)" to read --Andrew John Bissell, Edinburgh, Lothian (GB)--

(72) Inventor: Please correct "Maurizio Zaglio, Lothian (GB)" to read --Maurizio Zaglio, Edinburgh, Lothian (GB)--

(72) Inventor: Please correct "David Oliver, Lothian (GB)" to read --David Oliver, Edinburgh, Lothian (GB)--

(72) Inventor: Please correct "Santokh Singh Gataora, Lothian (GB)" to read --Santokh Singh Gataora, Edinburgh, Lothian (GB)--

(30) Foreign Application Priority Data: Please correct "1708724" to read --1708724.8--

Signed and Sealed this
First Day of November, 2022

Katherine Kelly Vidal
*Director of the United States Patent and Trademark Office*